(No Model.)
E. E. CALLAHAN.
TRACTION ENGINE.
No. 415,496. Patented Nov. 19, 1889.
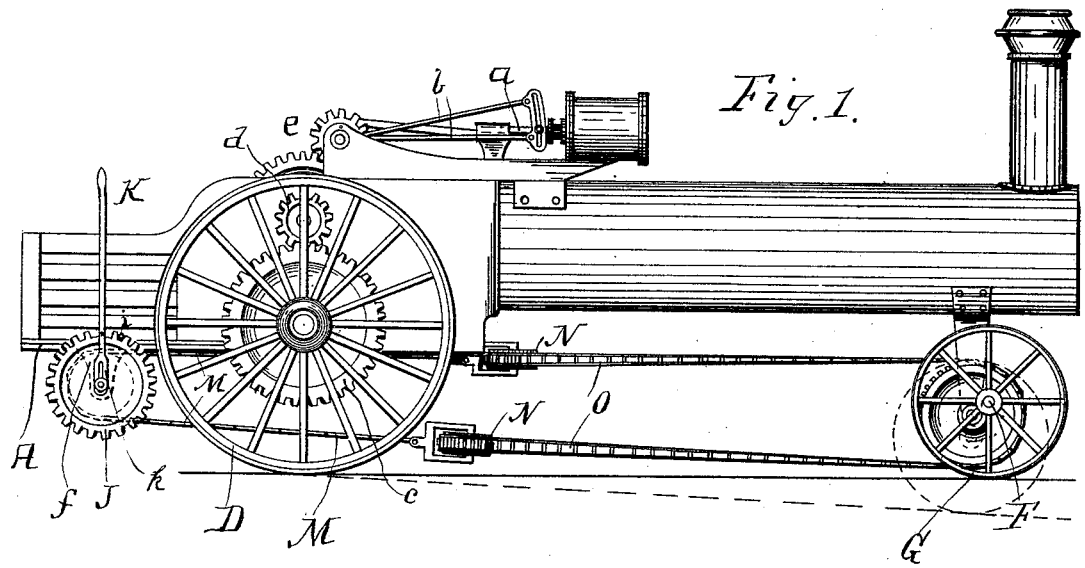
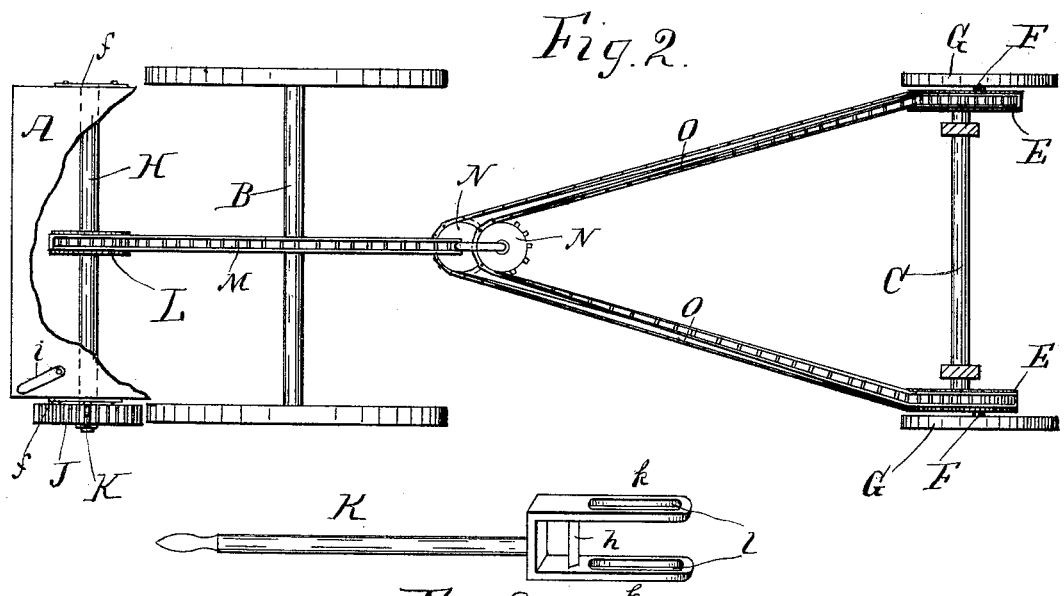
WITNESSES
Alvin Belt
C. J. Stockman.
INVENTOR
Ellery E. Callahan
By C. F. Belt
Attorney

UNITED STATES PATENT OFFICE.

ELLERY E. CALLAHAN, OF WELLSBOROUGH, PENNSYLVANIA.

TRACTION-ENGINE.

SPECIFICATION forming part of Letters Patent No. 415,496, dated November 19, 1889.

Application filed August 3, 1889. Serial No. 319,606. (No model.)

*To all whom it may concern:*

Be it known that I, ELLERY E. CALLAHAN, a citizen of the United States, residing at Wellsborough, in the county of Tioga and State of Pennsylvania, have invented certain new and useful Improvements in Traction-Engines; and I do hereby declare the following to be a full, clear, and exact description of the invention, such as will enable others skilled in the art to which it appertains to make and use the same.

This invention relates to improvements in devices for adjusting or raising and lowering one end of the boiler of a traction or portable engine, the object of the invention being to provide simple, conveniently-operated, and effective means by which one end of the boiler of a portable or traction engine can be raised or lowered, as occasion may require, so as to adjust the same with relation to the plane on which the engine is standing or traveling, in order to keep the flues of the boiler always covered with water, and thus prevent them from being injured or destroyed by the heat of the furnace.

A further object of the invention is to provide a device for adjusting the boiler of a traction or portable engine to which the wheels of any traction, road, or portable engine can be attached, and at the same time to utilize the ordinary axles of any of the above-mentioned engines.

In the accompanying drawings, forming part of this application, Figure 1 is a side elevation of a traction-engine employing my adjusting device and showing the different positions of the front wheels in dotted lines. Fig. 2 is a top plan view of my device, showing the front and rear axles of an engine and its wheels, with the other portions removed; and Fig. 3 is an enlarged perspective view of my ratchet-handle.

Like letters of reference denote like parts throughout the figures.

A denotes the engine-bed, which is supported in the usual way by a rear axle B and a front axle C. The rear axle B is provided with the usual large traction-wheels D, and by the piston-rod $a$, eccentric-rod $b$, and suitable gear-wheels $c$, $d$, and $e$ motion is transmitted to the said traction-wheels.

On either spindle of the front axle C is located a sprocket-wheel E, adapted to turn freely on the said axle, and is provided with a journal or spindle F, located eccentric to the center of the axle C. Instead of attaching the front wheels G to the axle-spindles, as is customary, they are attached to the journal or spindles F and are free to turn thereon as though they were located on the axle-spindle.

The rear of the engine-bed A is provided with depending brackets $f$, which form bearings for a shaft H, carrying a sprocket-wheel L, firmly secured to the said shaft. On one end of the shaft H is secured a ratchet-wheel J, provided with a ratchet lever or handle K, having arms $k$, which extend down on either side of the ratchet-wheel and have slots $l$ formed in their ends, through which the shaft H passes. The arms $k$ are provided with a cross-piece $h$, as shown in Fig. 3, which engages the teeth of the ratchet-wheel. The ratchet-pawl $i$ is pivoted on the engine-bed A and can be easily thrown in and out of engagement with the ratchet-wheel by the foot of the engineer or fireman. The sprocket-wheel L is provided with a chain M, the ends of which are provided with sprocket pulleys or wheels N, and accommodates an endless chain O, which passes over the sprocket-wheels E. By pushing on the handle K until the cross-piece $h$ engages the ratchet-teeth, and then moving said handle in one direction, it turns the ratchet and necessarily the shaft H, which carries with it the sprocket-wheel L and the chain M, and causes the endless chain O, which engages the sprocket-wheels N, to turn the sprocket-wheels E, carrying with them the eccentrically-pivoted wheels C, which raises the front end of the engine-boiler to a level.

To lower the front end of the engine-boiler, the lever or handle K has simply to be moved in the opposite direction. The sprocket-wheels E can be put on the axle-spindle in the same manner as ordinary wagon-wheels, and no alteration in the ordinary traction or portable engines so universally used need be made in attaching my device.

I do not wish to be understood as limiting myself to the precise construction and arrangement of my device as herein described and shown, or to exact materials of which the different parts are made, as I reserve to myself the right to alter the location and arrangement of the device without departing from the spirit of my invention.

Having thus described my invention, what I claim as new, and desire to secure by Letters Patent, is—

1. In an adjusting device for traction or portable engines, the sprocket-wheels provided with eccentrically-located spindles, an endless chain or its equivalent adapted to convey motion to said sprocket-wheels, a chain provided at either end with a sprocket wheel or pulley, and a shaft provided with a sprocket-wheel adapted to convey motion to the last-mentioned chain, substantially as and for the purposes set forth.

2. The endless chain O, a chain provided at either end with sprocket wheels or pulleys, and the sprocket-wheels E and L, substantially as and for the purposes set forth.

3. In an adjusting device for traction or portable engines, an endless chain and sprocket-wheels deriving motion from said chain, in combination with a chain provided with sprocket-wheels, substantially as and for the purpose set forth.

4. In an adjusting device for traction or portable engines, the combination of a shaft journaled in brackets, and a ratchet located on said shaft with the sprocket-wheels E, N, and L and their propelling-chains, substantially as shown and described.

5. In an adjusting device for traction or portable engines, the ratchet-wheel J and its handle having slotted arms and a cross-piece adapted to engage the teeth of said ratchet-wheel, substantially as and for the purpose set forth.

6. In an adjusting device for traction or portable engines, the combination of the shaft H, a sprocket-wheel, and a ratchet located on said shaft with the sprocket-wheels E N and their propelling-chains, as set forth.

7. In a traction or portable engine, the front axle C and the sprocket-wheels E, located on the spindles of said axle and provided with eccentric spindles, in combination with the front wheels G, located on the said eccentric spindles, substantially as and for the purpose set forth.

In testimony whereof I affix my signature in presence of two witnesses.

ELLERY E. CALLAHAN.

Witnesses:
GEORGE W. MERRICK,
ROBERT K. YOUNG.